United States Patent [19]
Grantz et al.

[11] Patent Number: 6,118,620
[45] Date of Patent: Sep. 12, 2000

[54] IN-HUB SPINDLE MOTOR WITH SEPARATE FLUID DYNAMIC BEARINGS

[75] Inventors: Alan Lyndon Grantz, Aptos; Norbert Steven Parsoneault, Scotts Valley; Samnathan Murthy; Hans Leuthold, both of Santa Cruz; Mohamed Mizanur Rahman, San Jose, all of Calif.

[73] Assignee: Seagate Technology LLC, Scotts Valley, Calif.

[21] Appl. No.: 09/060,225

[22] Filed: Apr. 14, 1998

Related U.S. Application Data

[63] Continuation-in-part of application No. 08/994,099, Dec. 19, 1997.
[60] Provisional application No. 60/064,501, Nov. 6, 1997.
[51] Int. Cl.[7] .............................. G11B 17/02; F16C 32/06
[52] U.S. Cl. .................. 360/99.08; 384/107; 384/132
[58] Field of Search .................... 384/107, 119, 384/124, 123; 360/99.08, 99.12, 99.05

[56] References Cited

U.S. PATENT DOCUMENTS

| | | | |
|---|---|---|---|
| 5,112,142 | 5/1992 | Titcomb et al. | 384/107 |
| 5,558,445 | 9/1996 | Chen et al. | 384/132 |
| 5,559,651 | 9/1996 | Grantz et al. | 360/99.08 |
| 5,716,141 | 2/1998 | Chen | 384/114 |
| 5,847,479 | 12/1998 | Wang et al. | 310/90 |
| 5,876,124 | 3/1999 | Zang et al. | 384/107 |

*Primary Examiner*—William Klimowicz
*Attorney, Agent, or Firm*—Flehr Hohbach Test Albritton & Herbert LLP

[57] ABSTRACT

A hydrodynamic bearing system where the bearing includes a shaft and two independent bearings, comprising a top cone or bi-sphere and a bottom cone or bi-sphere separated by a segment of the shaft. The bearing includes a hub supported bearing element rotating around the shaft and the shaft supported top cone and bottom cone; complementary surfaces of said bearing element and said cone define a narrow gap between the bearing support element for the bearing fluid. Sealing plates or seal elements define a fluid gap with a radially extending face of the cone; a gap also exists between an interior surface portion of each cone and the shaft. These gaps are connected so that separate flow paths are established, one around the top cone or bi-sphere and one around the bottom cone or bi-sphere. By providing two independent bearings, the stator can be mounted to the shaft, facing magnets supported on the hub to form an in-hub motor. When the load or RPM changes, the fluid pressure or movement in each bearing may change but the function of the bearing and its ability to provide stiffness and stability to the system will not be lessened.

20 Claims, 10 Drawing Sheets

IN-HUB SPINDLE MOTOR WITH SEPARATE FLUID DYNAMIC BEARINGS

CROSS-REFERENCE TO RELATED APPLICATION

This invention is based on U.S. Provisional Patent Application, Ser. No. 60/064,501, filed Nov. 6, 1997, assigned to the assignee of this application and incorporated herein by reference. This application is a continuation-in-part of U.S. application Ser. No. 08/994,099, pending filed Dec. 19, 1997 entitled "SIMPLIFIED CONICAL BEARING WITH INDEPENDENT FLOW PATHS" by Murthy, et al., assigned to the assignee of this application and incorporated herein by reference.

FIELD OF THE INVENTION

The present invention relates to disc drive storage systems, and more specifically, the present invention relates to a hydrodynamic fluid bearing for use in a disc drive storage system.

BACKGROUND OF THE INVENTION

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has lead to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair of races which allow a hub of a storage disc to rotate relative to a fixed member. However, ball bearing assemblies have many mechanical problems such as wear, run-out and manufacturing difficulties. Moreover, resistance to operating shock and vibration is poor, because of low damping. Thus, there has been a search for alternative bearing assemblies for use with high density magnetic storage discs.

One alternative bearing design which has been investigated is a hydrodynamic bearing. In a hydrodynamic bearing, a lubricating fluid such as gas or a liquid provides a bearing surface between a fixed member of the housing and a rotating member of the disc hub. Typical lubricants include oil or ferromagnetic fluids. Hydrodynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a hydrodynamic bearing. Also, the use of fluid in the interface area imparts damping effects to the bearing which helps to reduce non-repeat runout.

However, some hydrodynamic bearing designs themselves suffer from disadvantages, including a low stiffness-to-power ratio and increased sensitivity of the bearing to external loads or shock.

A desirable solution to this problem would be to have the spindle motor attached to both the base and the top cover of the disc drive housing. This would increase overall drive performance. A motor attached at both ends is significantly stiffer than one held by only one end.

Typically, hydrodynamic motor designs provide no method for top cover attachment. The reason for this is that in order to have top cover attachment, the motor (i.e. the fluid bearing which separates the fixed and moving parts) would need to be opened on both ends. Opening a motor at both ends greatly increases the risk of oil leakage out of the hydrodynamic bearing. This leakage among other things is caused by small differences in net flow rate created by differing pumping pressures in the bearing. If all of the flows and pressures within the bearing are not carefully balanced, a net pressure rise toward one or both ends may force fluid out through the capillary seal. Balancing the flow rates and pressures in conventional, known fluid bearing designs is difficult because the flow rates created by the pumping grooves are a function of the gaps defined in the hydrodynamic bearing, and the gaps, in turn, are a function of parts tolerances. Thus, a need exists for a new approach to the design of a hydrodynamic bearing based motor to optimize dynamic motor performance stiffness, and damping.

It is also desirable to design a hydrodynamic bearing which is open at both ends for other purposes than fixing both ends of the shaft to the base and cover of a housing. For example, with such an open-ended design, either end (or both) could be extended beyond the sleeve to be coupled to a driver or load, or for other purposes.

An effort has been made to address some of these problems with a conical bearing having independent flow paths. This design is disclosed in U.S. application Ser. No. 09/043, 066, filed Dec. 19, 1997 entitled "CONICAL HYDRODYNAMIC BEARING WITH TWO INDEPENDENT CIRCULATION PATHS", by Jennings, et al., (Attorney Docket No. A-64188), assigned to the assignee of this application and incorporated herein by reference. However, further consideration indicated that it would be desirable to simplify the two independent flow paths. Further, it is also desirable to make the capillary seals at the ends of the shaft as reliable as possible. It is also desirable to make the design of the shaft as simple as possible in order to reduce manufacturing costs and maintain achievable tolerances. It is especially attractive to make the shaft and any element it supports narrow, but stable, so that an in-hub design can be achieved.

SUMMARY OF THE INVENTION

Thus, it is an object of the present invention to create an improved hydrodynamic bearing which is relatively insensitive to changes in load and rotational speed.

Yet another objective of the present invention is to provide a hydrodynamic bearing motor in which the bearing is open at both the upper and lower ends.

A related objective of the invention is to provide a hydrodynamic bearing open at both ends in which the balance of fluid flow or pressure within the total system is maintained.

A further objective of the invention is to design a hydrodynamic bearing useful in a spindle motor or the like in which the motor could be attached to both the top cover and the base of the housing for the spindle motor.

Another objective of the invention is to provide a hydrodynamic bearing useful in a spindle motor or the like which is stiffer than known standard spindle motors which are supported only at one end.

Another objective is to provide a hydrodynamic bearing design having balanced internal fluid pressures during operation to minimize the likelihood of any lubricating fluid being lost during operation.

These and other objectives of the present invention are achieved by providing a hydrodynamic bearing useful as a bearing cartridge or as the cartridge may be incorporated into a spindle motor or the like, where the bearing includes a shaft and two independent bearings, comprising a top cone or bi-sphere and a bottom cone or bi-sphere sphere separated by a segment of the shaft. More specifically, the bearing includes a hub supported bearing element rotating around the shaft and the shaft supported top cone and bottom cone; complementary surfaces of said bearing element and said cone define a narrow gap between the bearing support element for the bearing fluid. Sealing plates or seal elements define a fluid gap with a radially extending face of the cone; a gap also exists between an interior surface portion of each cone and the shaft. These gaps are connected so that separate flow paths are established, one around the top cone or bi-sphere and one around the bottom cone or bi-sphere. By providing two independent bearings, the stator can be mounted to the shaft, facing magnets supported on the hub to form an in-hub motor. When the load or RPM changes, the fluid pressure or movement in each bearing may change but the function of the bearing and its ability to provide stiffness and stability to the system will not be lessened.

In one embodiment, a grooved pumping seal is provided surrounding the shaft pumping against the pressure established by the bearings at each end of the shaft, so that the system is well lubricated but does not lose fluid.

The bearing and bearing cartridge embodiments are also characterized by ease of assembly of the conical bearing spaced from each other along the shaft.

The hydrodynamic bearing assembly, and bearing cartridge, as disclosed herein used in a spindle motor, provides enhanced stiffness and damping within the cartridge system.

At each end of the shaft, a capillary seal is defined to prevent leakage of the bearing fluid into the outer atmosphere. In at least one embodiment, a unique centrifugal capillary seal is utilized to prevent fluid loss; this seal is designed to pump fluid from the outer end of the gap toward the conical bearing gap when the hub is rotating.

According to certain preferred embodiments, the hub supporting element adjacent each conical bearing seals are provided to extend from the outer region of the conical seal radially across the space defined for the stator and supporting the magnet and back iron and hub. Thus, the space inside the hub is sealed, enabling a simplified filling sequence for the hydrodynamic bearing based on pressure differential.

Other features and advantages of the present invention would become apparent to a person of skill in the art who studies the present invention disclosure given with respect to the following figures.

BRIEF DESCRIPTION OF THE DRAWINGS

FIG, 5C is a perspective view of the bearing cone which is shaft mounted to form the hydrodynamic bearing.

DETAILED DESCRIPTION OF A PREFERRED EMBODIMENT

Figure 1:
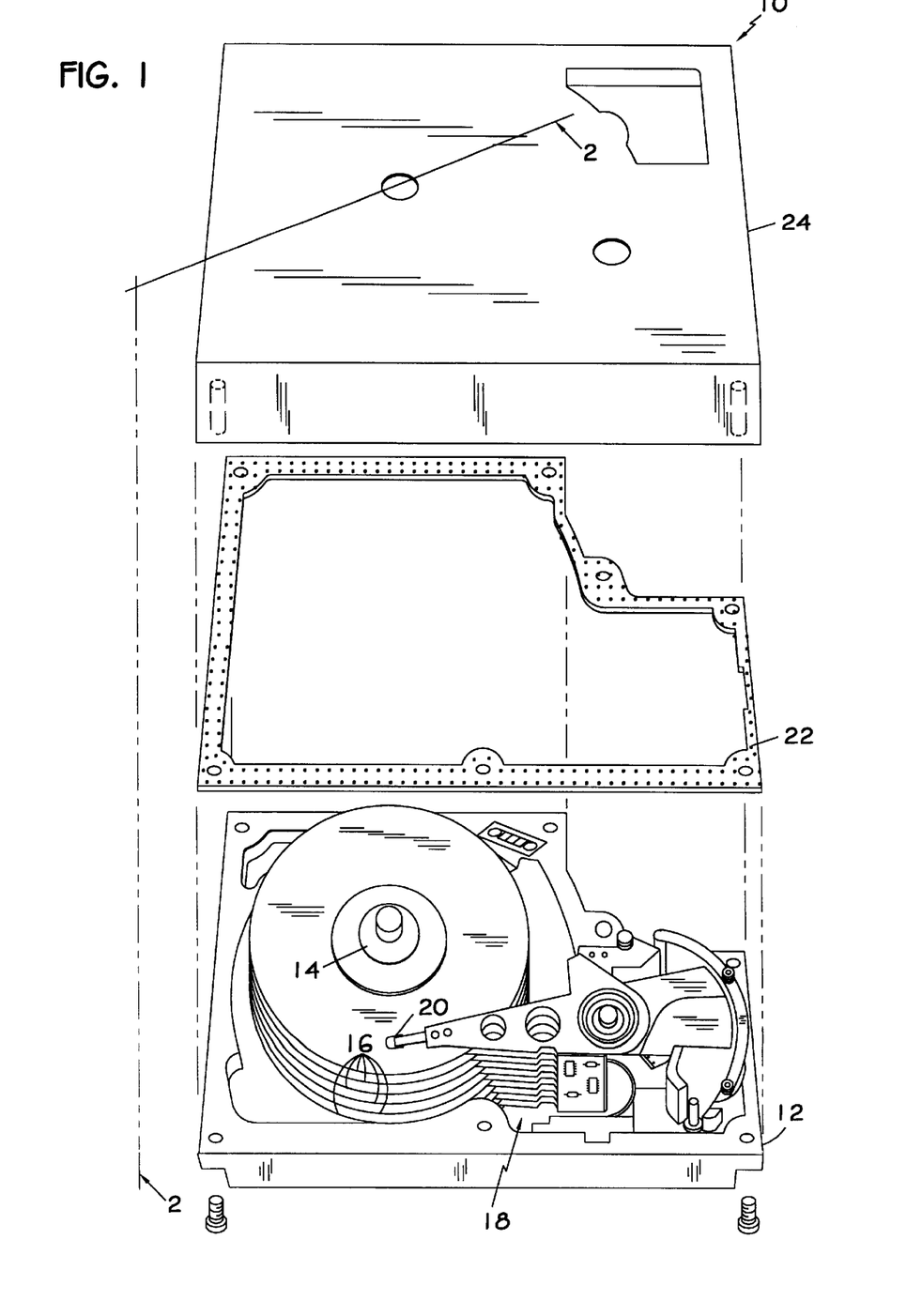
FIG. 1 is an exploded perspective view of a disc drive in which the present invention is useful.

FIG. 1 is an exploded perspective view of a magnetic disc drive storage system in which the present hydrodynamic bearing cartridge could be used. In the example to be discussed below, the use of the hydrodynamic bearing and associated cartridge will be shown in conjunction with a spindle motor. Clearly, this bearing design is not limited to use with this particular design of a disc drive, which is shown only for purposes of the example. The bearing cartridge (that is the bearing and motor elements, excluding the hub which is attached to support a disc) also has numerous other uses outside the field of disc drives.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain each transducer flying over the surface of the associated disc. In present day technology, the spacing distance between the transducer and the rotating disc surface is measured in microinches; thus it is absolutely essential that the disc does not tilt or wobble.

Figure 2:
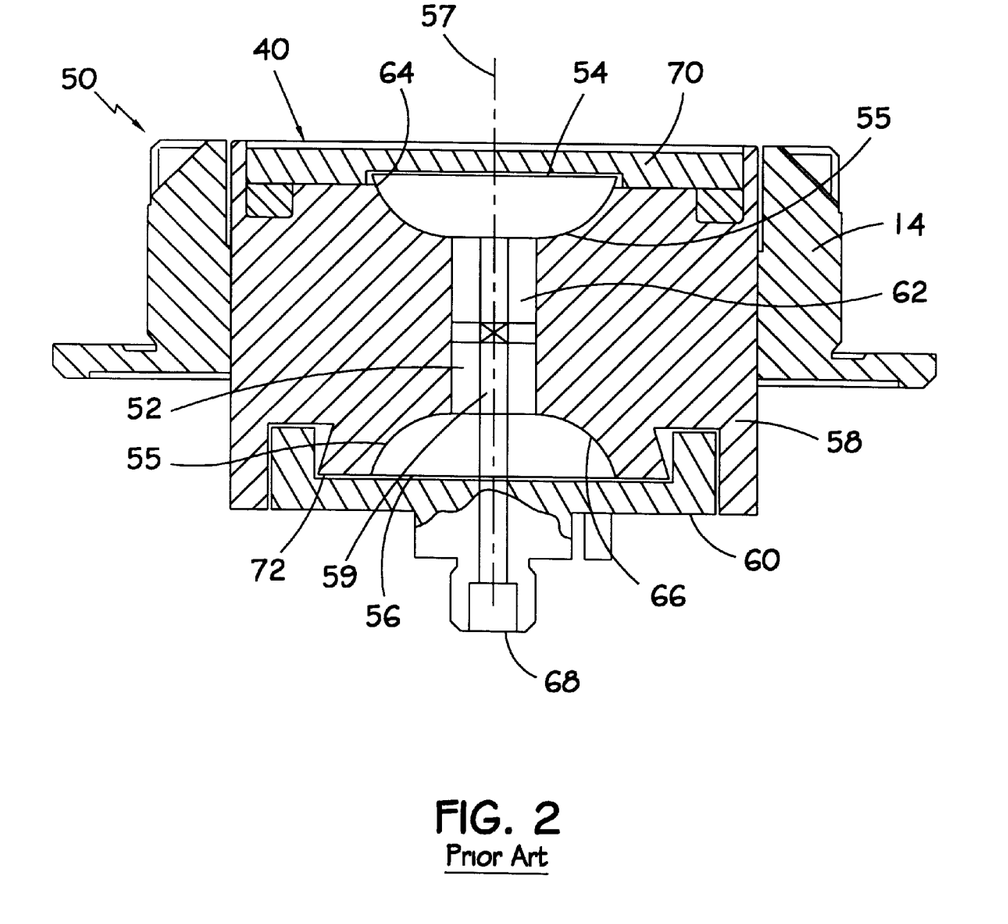
FIGS. 2 and 3 are vertical sectional views of prior art hydrodynamic bearing designs.

FIG. 2 is a cross sectional view of a further prior art drive spindle assembly of a type which can be supported only from the base of the housing of the system using the hydrodynamic bearing cartridge, in this case a disc drive assembly. The figure is taken from U.S. Pat. No. 5,559,651, which is assigned to the assignee of the present application and is incorporated herein by reference.

In FIG. 2, the cartridge 40 which includes the hydrodynamic bearing is shown incorporated in a spindle motor 50 which is usable to drive the discs in the disc drive 10 of FIG. 1. The design includes a drive rotor or hub 14 rotatably coupled to the shaft 52. The shaft 52 includes an upper hemisphere or convex portion 54 and a lower hemisphere or convex portion 56 received in sleeve 58 which rotates relative to the shaft. The shaft 52 is fixedly attached to the base 60, which may be incorporated in or supported from the housing base 12 described with respect to FIG. 1. The sleeve 58 receives the journal 62 of shaft 52 and has upper hemisphere shaped, concave receptacle 64 and lower hemisphere shaped concave receptacle 66. A fill hole 68 is also provided to a reservoir 59 in (as drawn, the lower end) fixed member 52 to provide bearing fluid to the hydrodynamic bearing, and rotor 14 includes a counterplate 70 which is used to close off one end of the hydrodynamic bearing to the atmosphere. In operation, the bearings shown in this figure comprises hydrodynamic bearings in which a lubricating fluid such as oil circulates through gaps between the fixed member which is the shaft and the rotating member which in this case is the sleeve. Rotation of the rotating member causes the lubricating fluid to circulate.

As further shown in FIG. 2, oil is trapped in the hydrodynamic bearing by a diverging capillary seal 72. However, as can also be seen from an inspection of this Figure, this design is not adaptable to being opened to the atmosphere at both ends, as the counterplate 70 is provided at one end to close off the hydrodynamic bearing to the atmosphere, the counterplate 70 rotating with the sleeve.

Figure 3:
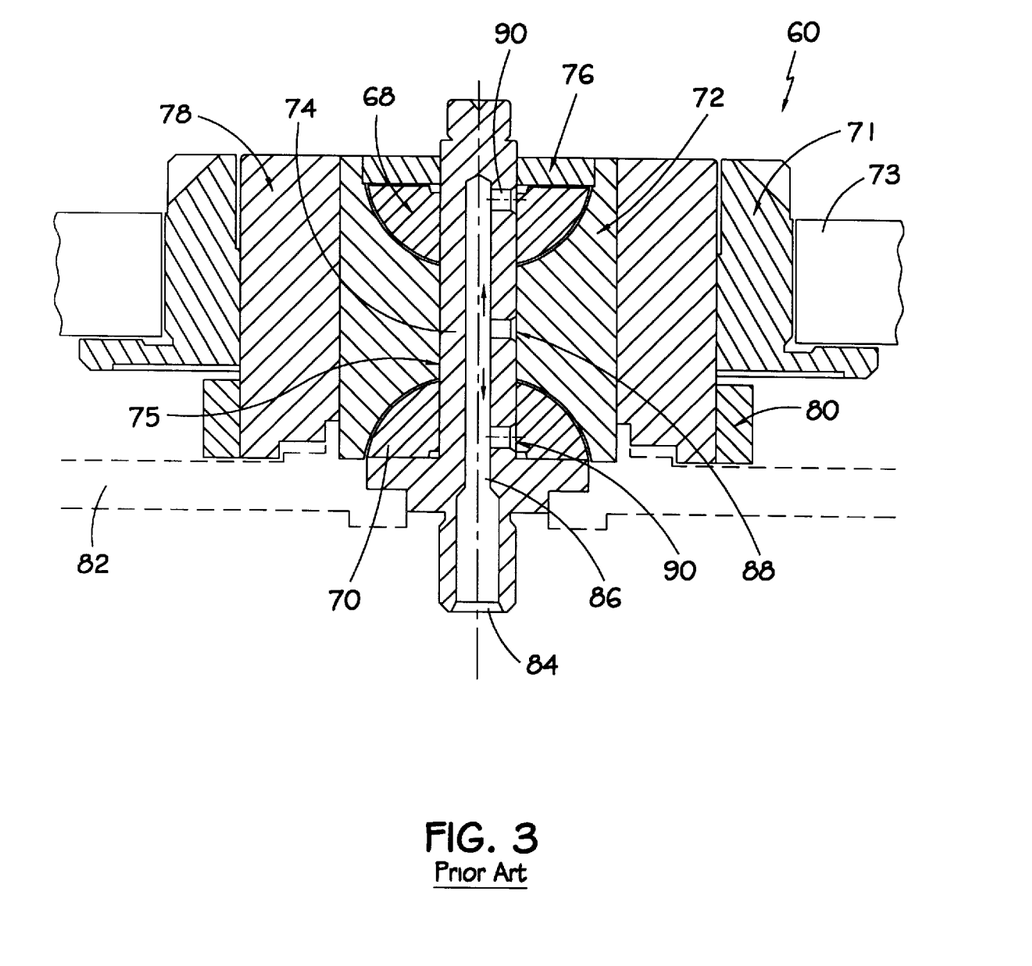

FIG. 3 is a variation of the design shown in FIG. 2. This Figure, also taken from the '651 patent, illustrates the use of a central reservoir 86. Spindle 60 includes a rotor hub 71 which carries disc 73 and is rotatably coupled to shaft 75. Shaft 75 includes upper hemisphere 68 and lower hemisphere 70 received in cartridge sleeve 72. Sleeve 72 receives journal 74 of shaft 75. The top portion of shaft 75 is sealed with seal plate 76, and journal 74 extends therethrough. Hub spacer 78 is coupled to rotor hub 71, and carries permanent magnets 80. Shaft 75 is received in base 82, and includes fill hole 84. Fill hole 84 connects to passageway or reservoir 86, which extends through the center of shaft 75. Passageway 86 connects to center passageway or bore 88 and distal bores 90. In operation, oil flows into bore 86 through center bore 88 and out distal bores 90. This is indicated by arrows shown in bore 86. Again, in this embodiment, the fluid circulation paths in the hydrodynamic bearing are sealed off from the outer atmosphere by seal thrust plate 76.

The present invention will next be described with respect to the following figures. This application will disclose in detail the overall motor design. Details of several of the structural elements which appear herein can also be found by referring to the cited co-pending patent application which are incorporated herein by reference.

Overall, the design for the present in-hub spindle motor resulted from the need to incorporate fluid dynamic bearings (FDB) in a spindle motor, utilizing an in-hub configuration, without compromising the electromagnetic efficiency of the motor. By splitting the bearings into two mirror images which are at or close to opposite ends of the shaft, little or no more bearing space is utilized than in a ball bearing motor, allowing the achievement of a in-hub design with a relatively small cross-section.

More conventional FDB motors (other than shown in FIGS. 2 and 3) utilize a journal bearing and a thrust plate to react radially and axially forces. The journal bearing utilizes a significant amount of volume along the central portion of the shaft of the motor, detracting from the space available for electromagnetics, and compromising the size of the in-hub configuration desired. By utilizing separate FDB'S, at each end of the shaft as disclosed herein, which in a preferred embodiment are mirror images of each other although modifications of one may be utilized for various operational or design efficiencies, then no more space is used than the ball bearings that these FDB's replace. The motor is built-up from the stator-shaft assembly outward. The motor bearings are filled with oil either with pressure activated seals (which may be easily incorporated into the present design) or through capillary attraction.

The sealing itself at the ends of the shaft, both of which are opened so that both ends of the shaft may be fixed) is accomplished either with a pair of centrifugal capillary seals and groove pumping seals, or with one of a centrifugal or capillary seal at the other end of each cone. The present design also lends itself easily to stator interconnection wires being routed through the center of the shaft, and attached to an integral connector at the bottom of the shaft.

Figure 4:
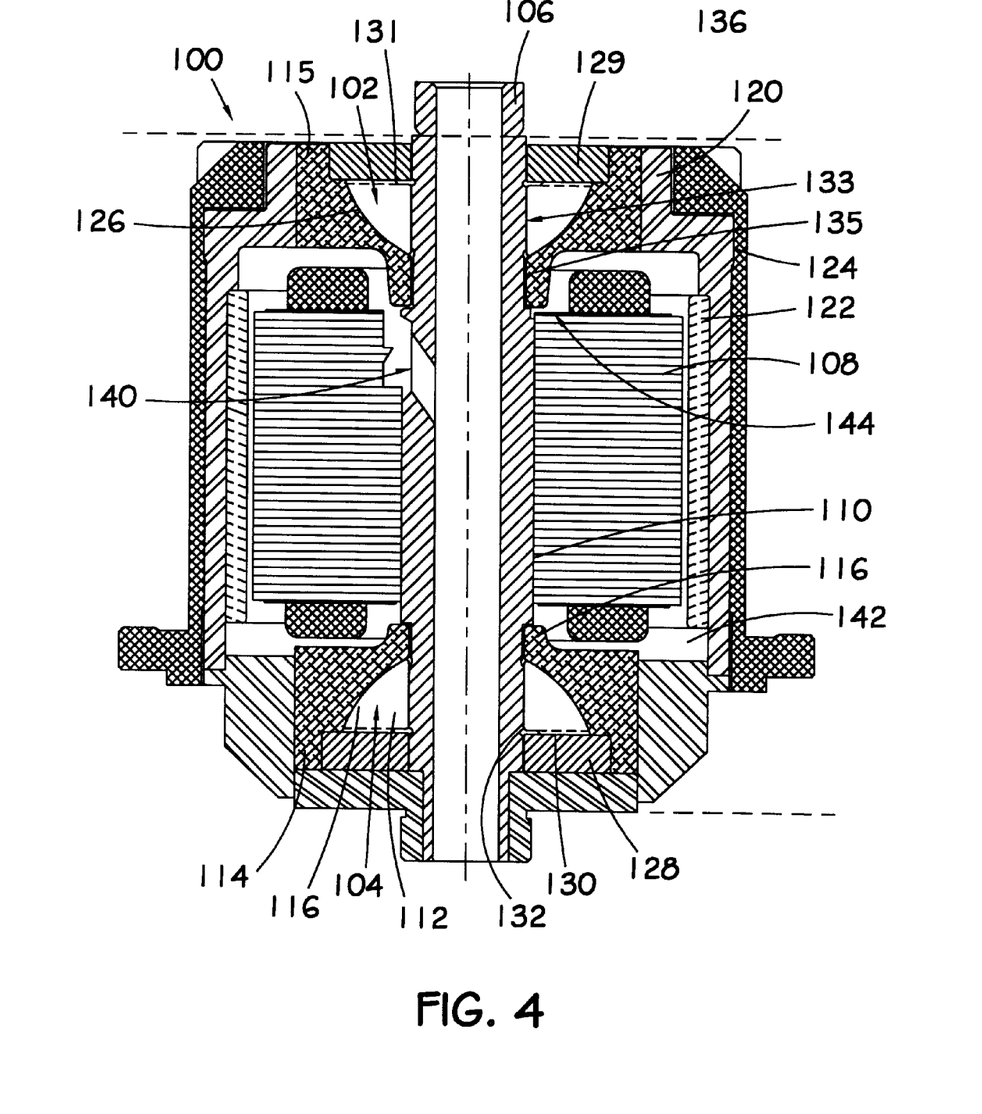
FIG. 4 is a vertical sectional view of a first embodiment of this invention.

Referring to FIG. 4, the figure shows an exemplary in-hub spindle motor with a split fluid dynamic bearing arrangement with two totally separate fluid dynamic bearings 102, 104 mounted at or near opposite ends of a shaft 106 and on opposite sides of a stator 108 mounted on the external surface of the central section of the shaft 1 10 intermediate to fluid dynamic bearings. Preferably, the fluid dynamic bearings 102, 104 are mirror images of each other. Each comprises (referring to one of the bearings), a bearing cone 112 which is preferably press fit on an external surface of the end section of the shaft 106 and a bearing seat 114 having a section 116 which is mounted to or press fit on a section of the shaft between the bearing cone 112 and the central section 1 10 of the shaft. The bearing cone 112 and seat 114 include complementary surfaces 116, 117, respectively, which together define a portion of the fluid dynamic bearing gaps. As the upper and lower bearing seats 114, 115 which support the back iron 120, magnet 122 and hub 124 rotate outside the shaft 106 and the stator 108 of the motor, fluid is maintained in the gap 126 between the bearing cone 112 and the seat 114 to establish a bearing means for allowing this free rotation. The fluid is intended to circulate and be maintained in gaps defined around all three sides of the cone 102, 104. Therefore, each bearing seat 114, 115 supports at its axially distal end from the center of the shaft a counterplate 128, 129, respectively, which is spaced from a surface of the bearing cone 102, 104 to establish a fluid gap 130, 131. The bearing gap is completed through openings 132, 133 between the radially inner surface of each cone 102, 104 and the surface of the shaft 106. These openings 132, 133 may be formed on either the outside of the shaft or the inside of the cone. Thus a complete fluid path is established around all three sides of each bearing cone.

One of the complementary surfaces 116, 117 of each bearing cone and complementary bearing seat has grooves so that proper fluid pressures are established and circulation is established and maintained through the entire circulation path described so that the bearing seats 114, 115, magnet 122, back iron 120 and hub 124 all rotate freely around the shaft with energization of the stator 108. To prevent fluid from escaping from the fluid dynamic bearing either into the interior region of the motor, or to the atmosphere surrounding the motor, capillary seals are provided on either side of each fluid dynamic bearing. Referring, for example, to the fluid dynamic bearing 102, a capillary seal 135 is established between relatively diverging walls of the shaft 106 and seat 115; similarly, a capillary seal 136 is established at the opposite end of the FDB by providing relatively diverging walls between the shaft 106 and the thrust plate 129. This diverging wall capillary seal construction is well known in this technology and need not be explained further.

A means for leading the control wires to the stator 108 from an external power source is provided comprising a slot 140 in the central section of the shaft 110 connecting the stator 108 to a connector which may be provided in the hollow or partially open central section of the shaft 106. Further details of this connection may be found by reference to an application of Grantz, et al. entitled, "LOW PROFILE IN-SHAFT CONNECTOR," Attorney's Docket A-65482 U.S. application Ser. No. 09/059,888, filed Apr. 14, 1998, now U.S. Pat. No. 5,997,357, filed contemporaneously herewith and incorporated herein by reference.

It can further be seen that this design by providing bearing seats 114, 115 aligned above and below the stator, and supporting opposite ends of the back iron and hub, establishes a sealed interior 142 for the stator. Sealing the interior of the in-hub motor diminishes the possibility of generating particles or other contamination which can escape to the atmosphere surrounding the motor. The design also provides for and facilitates filling the fluid dynamic bearings with bearing fluid by providing a pressure activated seal 144. This seal could be a formed seal or an O-ring which would normally be in retracted state, allowing free rotation of each bearing seat relative to the shaft 106. When activated, by creating a pressure differential between the atmosphere surrounding the motor and the internal region 142 of the motor which is now possible because of the sealed nature of the internal region 142, this seal 144 would expand and fill the space between each bearing seat 114, 115 and the region of the shaft 106 where the seat is mounted. Fluid could now be drawn into the internal region of each fluid dynamic bearing 102, 104 but could not escape into the internal region of the motor 142 past this pressure activated seal. Seal 144, as is well known in this field, would retract when the pressure differential is removed, allowing again the free rotation of the bearing seats relative to the shaft. The fluid would now be restrained within each fluid dynamic bearing by the presence of the capillary seals.

It should be noted that, although the figures show that the surfaces of the FDB's 102, 104 are spherical, this design and the other designs to be disclosed in this application work equally well with mating conical surfaces or surfaces of other advantageously designed profiles such as taught in the application "Conical Bearing With Lenticular Profile," invented by Leuthold, et al., Attorney's Docket A-65350 U.S. application Ser. No. 09/060,312, filed Apr. 14, 1998, now U.S. Pat. No. 6,019,516, filed contemporaneously herewith and incorporated herein by reference.

Figure 5A:
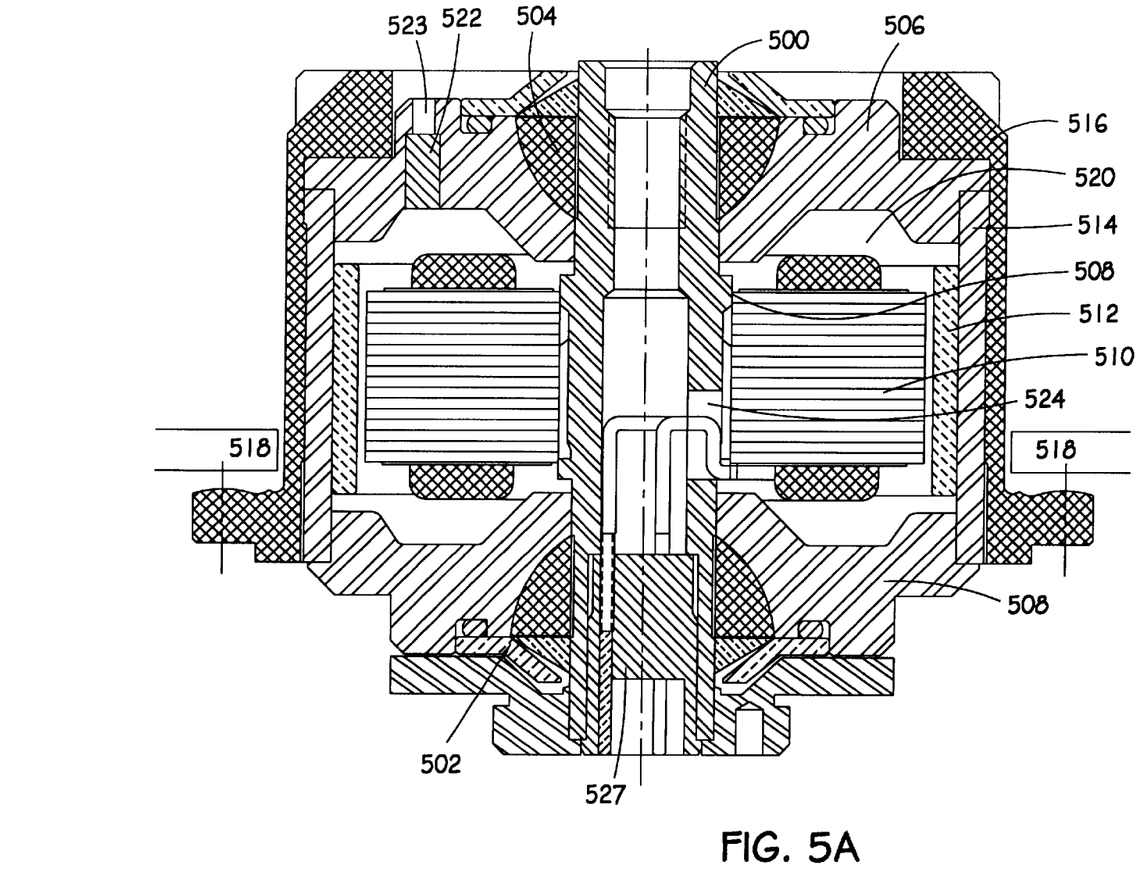
FIG. 5A is a vertical section of a second embodiment of the invention.
Figure 5B:
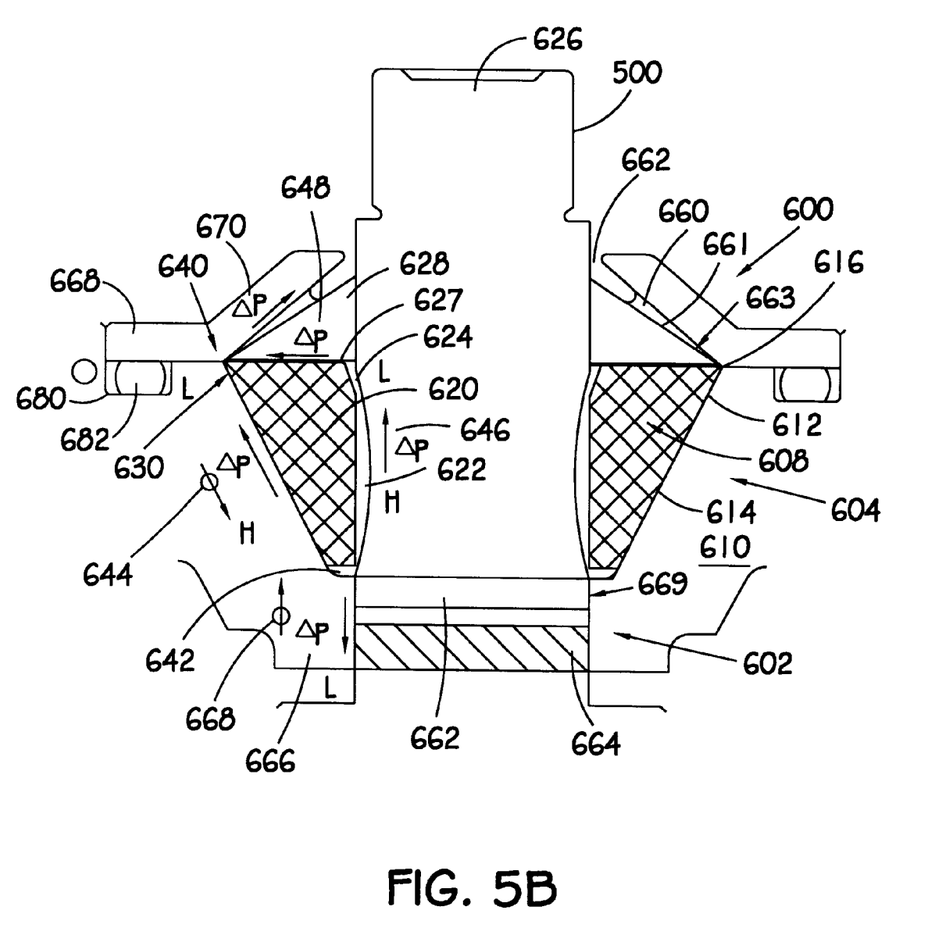
FIG. 5B is a vertical section of one hydrodynamic bearing, together with the adjacent sealing means.
Figure 5C:
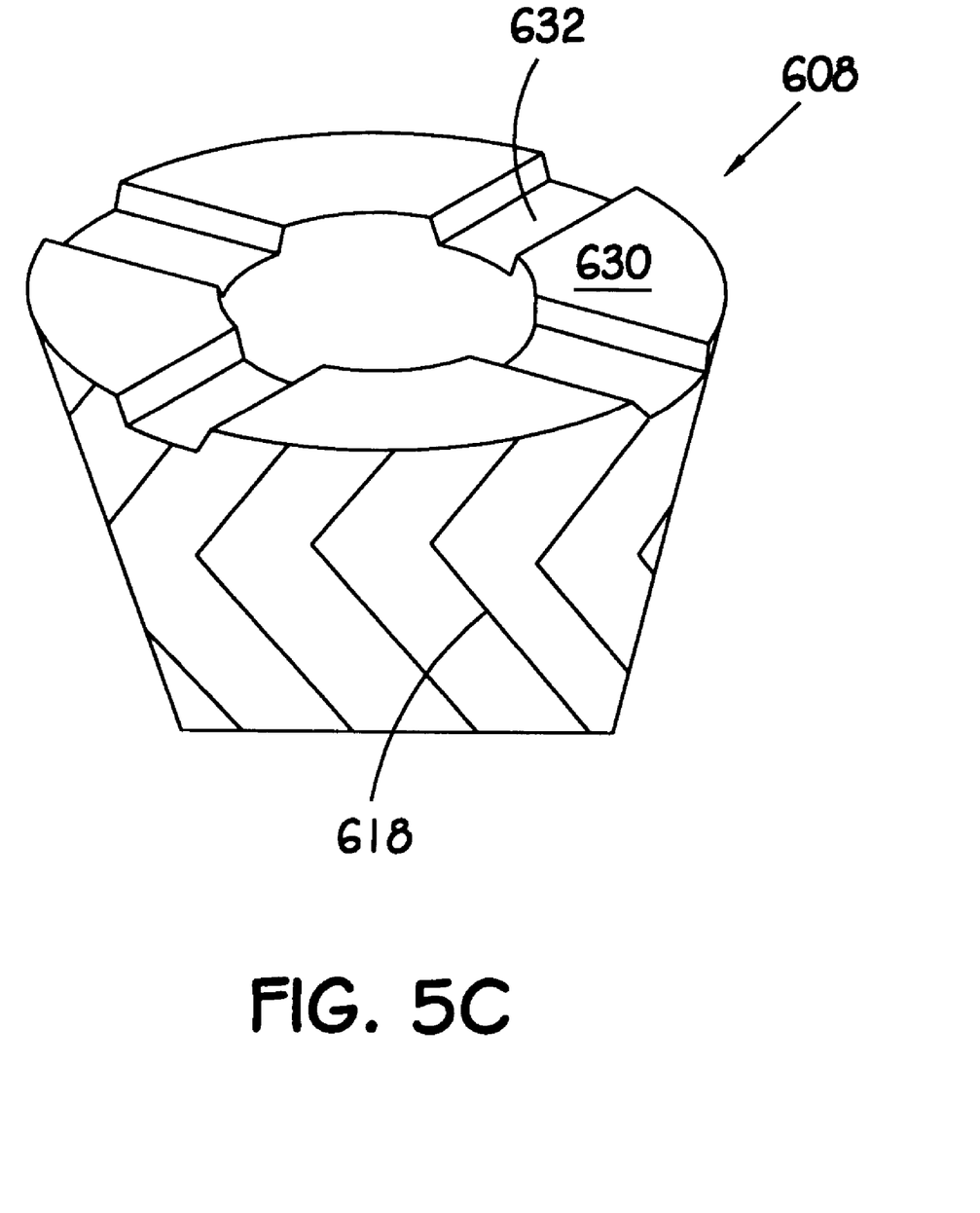
Figure 5D:
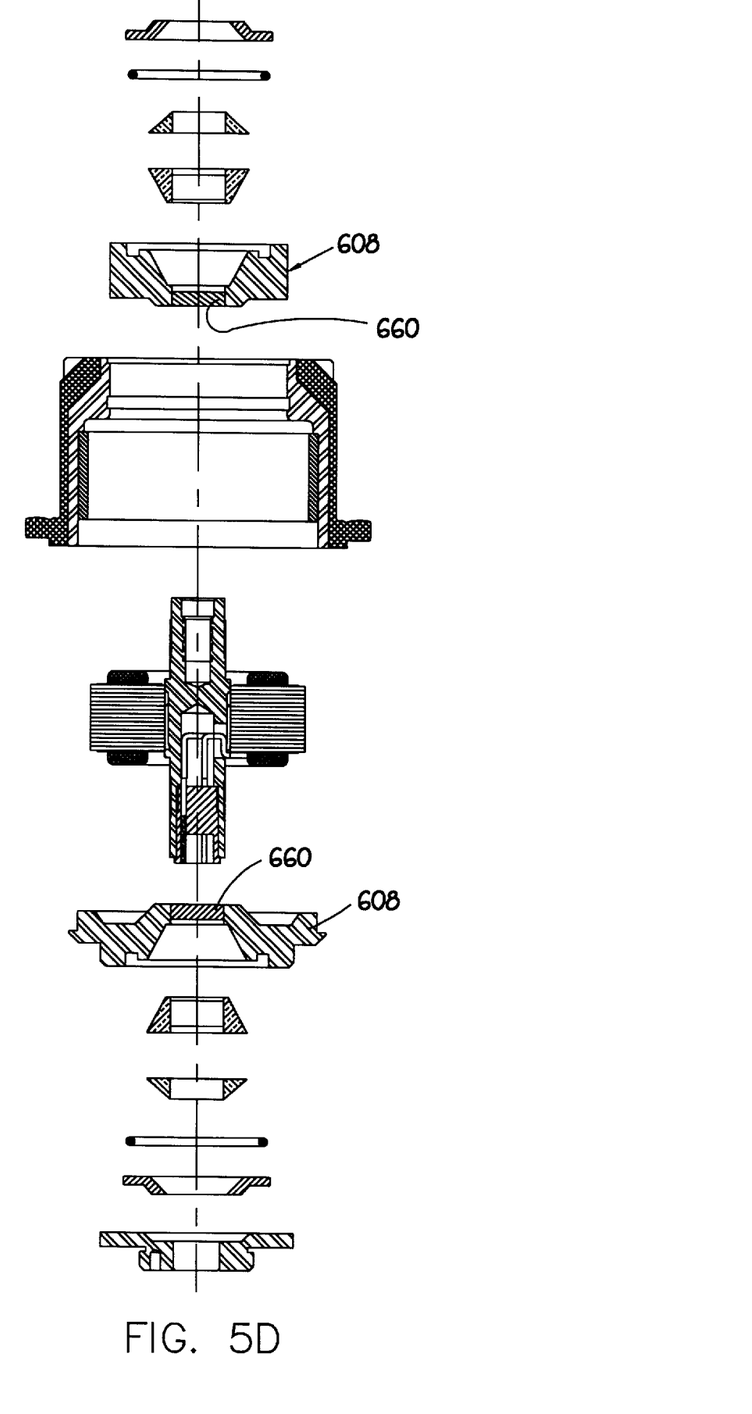
FIG. 5D is an exploded view of the motor embodiment also shown in FIG. 5A.

An alternative and preferential embodiment is shown in FIGS. 5A; the primary elements of the assembled design of FIG. 5A appear in exploded form FIGS. 5C and 5D. FIG. 5B will be referred to to illustrate and explained the means for establishing pressure differentials which are utilized to maintain and enforce the fluid distribution over the surfaces of the conical bearings, as well as means for expelling any air bubbles which may intrude into the fluid bearing surface.

As with the design of FIG. 4, a fixed shaft 500 supports grooves, spherical or conical bearings 102, 104 and is supported near the opposite ends of the shaft. The central section 508 of the shaft directly supports a stator 510 which cooperates with a magnet 512. The stator mounting, with its inner dimension generally aligned between the FDBs, provides a narrow profile for this in-hub motor. The magnet 512 is supported from a back iron 514 on the interior surface of hub 516 so that energization of the stator 510 causes rotation of the hub and the disc or discs 518 supported thereon. It can be seen that the bearing seats 506, 508 extend radially from the shaft out beyond the radial dimension of the shaft supported stator 510 and support the back iron 514 and the hub 516. This defines an enclosed space 520 for the stator and magnet, enclosing a possible source of contaminants. A pressure equalizing filter 522 is incorporated into at least one of the bearing seats 506. The filter extends at least part way through an opening 523 which extends entirely through the bearing seat 506 so that no contaminants generated within space 520 can escape. Defining this enclosed space also allows implementation of the vacuum filling technique described with respect to FIG. 4 even in this embodiment; the opening 523 itself could simply be plugged while filling occurs. The stator itself is connected to the necessary control wires to energize the stator through a multi-pin plug connector 527, whose wires extend through a slot 524 in a wall of the shaft 500 to be connected to the stator windings 510. Details of this connector can be found in U.S. application Ser. No. 09/059,888, filed Apr. 14, 1998, now U.S. Pat. No. 5,997,357, entitled "LOW PROFILE IN-SHAFT CONNECTOR," Grantz, et al., Attorney's Docket A-65482, filed contemporaneously herewith and incorporated herein by reference. Therefore, further details of this connector and its insertion into the shaft and connection to the external control wires will not be disclosed herein.

As with the previous embodiment of an in-hub spindle motor, this motor also is open at both ends, presenting the problem of easily filling the fluid dynamic bearings 502, 504 with bearing fluid, and thereafter preventing the escape of any such fluid. This invention also addresses the problem which is posed by the fact that air can sometimes become entrapped in the fluid, reducing the effectiveness of the fluid dynamic bearing. Therefore, the present invention incorporates means for expelling the air from the fluid dynamic bearing, so that the effectiveness and life time of the bearings are optimized. As with the previous embodiment, the motor of FIG. 5A incorporates two totally separate fluid dynamic bearings on either side of a stator, with no fluid flow along the central section 508 of the shaft, the FDB's being mounted on either side of this central section. Details of each of the bearings and the general theory of their operation will next be explained with respect to FIG. 5B. Further details and alternative approaches to these designs, which may be incorporated in the present motor, can be found in the following applications all of which are filed contemporaneously herewith and incorporated herein by reference:

Attorney's Docket A-5485 U.S. application Ser. No. 09/060,342, filed Apr. 14, 1998, entitled "GROOVE PUMPING SEAL," by Grantz, et al.;

Attorney's Docket A-65481 U.S. application Ser. No. 09/060,328, filed Apr. 14, 1998, entitled "CENTRIFUGAL CAPILLARY SEAL," by Grantz, et al.; and Attorney's Docket A-65483 U.S. application Ser. No. 09/060,224, filed Apr. 14, 1998, now U.S. Pat. No. 5,980,113, entitled "ASYMMETRIC SEALING MEANS," by Grantz, et al.; all of which are assigned to the assignee of the present invention and incorporated herein by reference.

Thus, referring next to FIG. 5B, the sealing design shown in FIG. 5B results from the need to providing a very positive sealing means for fluid dynamic bearing motors such as shown in FIGS. 4 and 5A which have two independent fluid dynamic bearings. Of course, the design of FIG. 5B and its alternatives could be used with other motors wherever two independent fluid dynamic bearings are used. The significance of the design, among others, is that it does not require a close balance of pressure between the top and bottom of the bearing. Further, by combining the characteristics of the centrifugal capillary seal generally indicated at 600 (which provides a means for pushing fluid toward the fluid bearing when the motor is spinning and for holding the fluid in the gap when the motor is at rest), and the grooved pumping seal generally indicated at 602 (which provides a means for holding and sealing the fluid in the FDB), together with the conical/spherical bearing generally indicated at 604, the fluid is positively maintained on the surface of the bearing. The seals also provide means for expelling any air bubbles which may enter the bearing system.

As is already well known, the primary support system in the bearing comprises the bearing cone 608 and the surrounding bearing seat 610. These pieces define facing surfaces 612, 614 which are separated by gap 616 of about five microns (although this dimension is representative of example only; it may be greater or less depending on the tolerances achieved by parts and assembly methods). Fluid fills this gap 616, and is maintained under pressure within this gap by grooves 618 on the surface of the shaft cone 608 which is shown in FIG. 5C. To allow for fluid circulation, and maintenance of the fluid in the gap 616, the gap is extended over the back surface 620 of the bearing cone 504 by providing grooves running linerally along the back surface of the cone or the facing surface 624 of the shaft. These grooves 622 allow the fluid to pass axially toward the distal end 626 of the shaft 500. The path or bearing gap for the fluid is completed through a gap between a wall 627, the sealing cone 628 and the upper surface 630 of the bearing cone 608. Most efficiently, the path is through grooves 632 formed in the top surface 630 of the cone 608 (see the cone detail in FIG. 5C), although the grooves could also be provided in the complementary surface of the sealing cone 628.

As is shown by the arrows marked Δp on FIG. 5B, the pumping action of the grooves 618 on the face of the cone create a pressure differential from the apex 640 of the bearing cone toward the narrower end 642 of the cone. Thus, the fluid flow over the surface of the cone being generally from the point of lower to higher pressure, is as marked by the arrow 644 and continues axially toward the distal end 626 of the shaft following the path marked by arrow 646 and returns to the apex of the cone through the grooves 632 following the pressure arrow 648.

In order to provide a means for fluid to be inserted into the fluid dynamic bearing, as well as to provide a means for air bubbles to be expelled from the bearing 610, a centrifugal capillary seal 660 is incorporated into the design, leading from the open end 662 of the fixed shaft 500 and relatively rotating parts, down to the apex 640. The seal is formed between a wall 666 of the shield seal 640 which rotates with and is supported from (or even integrated with) bearing seat 506 and hub 516, and wall 663 of seal cone 628 which is supported from the shaft. The diverging walls 661, 663 are separated by a measurable gap 662 at the axially outer end of the seal; the narrowest point is at or near the apex 640 of the sealed design. As disclosed in greater detail in the incorporated applications, the centrifugal capillary seal 660 utilizes centrifugal force which is created by the relative rotation of the walls 661, 663 to create a pressure gradient represented by the arrow Δp, 670, to push oil back into the motor whenever the motor is spinning.

Establishing this combination of pressure gradients also provides a means for expelling air bubbles from the entire fluid dynamic bearing system. That is, some air bubbles may appear in the system and have a negative effect on performance. However, by establishing the pressure gradients represented by the various arrows Δp over the surfaces of the bearing cone, and through the capillary seal, the air bubbles can be expelled. Specifically, it is known that when the pressures are established, and the relative rotation has been established, the air bubbles will move from the point of highest pressure to lowest pressure. Therefore, any air bubbles appearing in or near the quiet zone 669 of the groove pumping seal 602 (to be explained below) or near the arrow portion 642 of the bearing cone, or along any surface of the bearing cone will move toward the point of lowest pressure which is the apex of the bearing cone 608 and sealing cone 628. Once reaching that point, the air bubbles will continue to the point of lowest pressure, moving out through the centrifugal capillary seal and being expelled through the capillary seal. Thus, this system operates to continuously purge itself of any air which might inadvertently enter the system, while very effectively sealing the fluid within the bearing system.

In order to further enhance the sealing stiffness of the system, a grooved pumping seal 602 is provided, typically and preferably immediately axially inward from base 642 of the bearing cone, between the bearing cone and the central portion of the shaft where the stator is mounted. This grooved pumping seal 602, in a preferred form, can be defined on the face of a central section 660 of the bearing seat 608 which also supports one of the two faces of the fluid dynamic bearing. In a preferred form, this grooved pumping seal comprises an ungrooved surface section or quiet zone 662 surrounding a portion of the ungrooved shaft immediately adjacent the base 642 of the bearing cone, and a grooved pumping region 664 which also closely surrounds an ungrooved section of the shaft immediately adjacent the quite zone 662. This grooved pumping seal 602 is intended to be a low volume, very high stiffness seal. It is a capillary seal which employs active pumping by virtue of the presence of relatively deep grooves in one section 664 of the seal to provide very high sealing stiffness. When the shaft is at rest, the oil settles into the grooves but cannot pass further down the shaft because of the capillary effect of the grooves and diverging ends. When the motor spins up, the relative rotation of the shaft 500 and the surrounding section 664 of the grooved pumping seal create the pressure gradient indicated by the arrow Δp, 666. This causes an oil fluid flow out of the grooves into the quiet zone 660 as indicated by the arrow 668. Further, because of this quiet zone, there is no pumping action to force the oil out of the grooved pumping seal into the fluid dynamic bearing, so that the necessary fluid for effective operation of this grooved pumping seal is maintained. Finally, as explained above, any air bubbles which appear in the quiet zone would tend to move contrary to the pressure gradients in the fluid dynamic bearing and be expelled from the distal end of the shaft through the centrifugal capillary seal; any further air bubbles which moved into the grooves of the groove section 664 could be expelled into the interior section of the motor because of the strong pressure gradient created by the rotation of the grooved pumping seal.

Finally, it should be noted that the depth of the grooves and/or the width of the grooves diminishes as the oil is moved up through the grooved pumping zones 664 into the quiet zone 660. This enhances and provides a means for pumping the oil efficiently out of the grooves into the quiet zone during motor operation, while providing a strong capillary effect in the grooves to maintain the oil in the grooved pumping seal 602 when the motor is not in operation.

It should be further noted that although the preferred embodiment of this design discloses utilizing grooves on the central section of the bearing seat, a separate grooved piece could be provided separate and apart from the bearing seat; and in a further alternative, that the central section of the bearing seat which surrounds the shaft could be left entirely smooth, and the grooves instead imposed upon the shaft, although this would presumably create some further fabrication difficulties.

FIG. 5D shows the relative position and scale of the individual elements which make up the exemplary motor of FIG. 5A; a further explanation of the individual elements and the manner in which they are assembled into a completed motor can be found in U.S. application Ser. No. 09/060,030, filed Apr. 14, 1998, entitled "FABRICATION MEANS FOR IN-HUB SPINDLE MOTOR WITH SEPARATE FLUID DYNAMIC BEARINGS," by Grantz, et al., filed contemporaneously herewith and incorporated herein by reference.

It may further be noted that the bearing seats 608 also includes a groove 680 in the upper surface thereof A flexible gasket 682 is captured in this groove 680 between the surface of the bearing seat and an arm of the shield seal. As the pressures and fluid flow at the apex 640 according to this design can be noticeable, this gasket provides a means for preventing the radial escape of any fluid away from the fluid dynamic bearing and the centrifugal capillary seal.

Figure 6A:
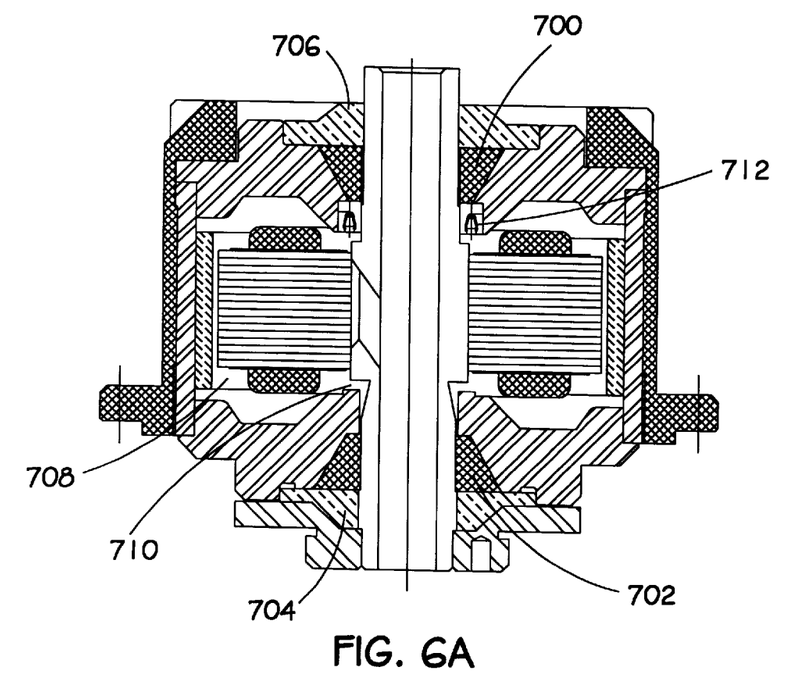
FIG. 6A is a vertical sectional view of an alternative, third embodiment of the invention.
Figure 6B:
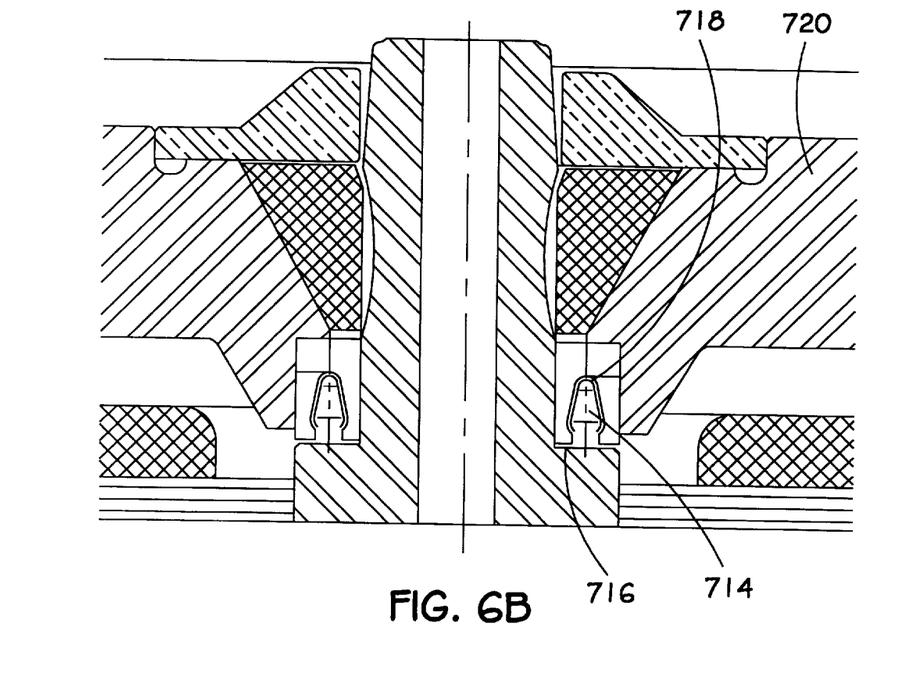
FIG. 6B is an enlarged view of a detail of the embodiment, including an alternative sealing means for the interior of the motor.

A further exemplary alternative to the present invention is illustrated in FIGS. 6A and 6B. It can be seen that this embodiment also incorporates a pair of symmetrical fluid dynamic bearings 700, 702 isolated at the open ends of the shaft by capillary seals 704, 706. As can be seen, the lower of the two bearings is also isolated from the interior 708 of the motor by further capillary seal 710. The upper fluid dynamic bearing 700 is isolated by a rotary contact seal 712. This rotary contact seal, shown in greater detail in FIG. 6B, includes a male portion supported on a shelf 716 of the shaft and a female overlapping portion 718 supported on the bearing seat 720. The use of this type seal enhances the sealing effect at the base of one or both of the two fluid dynamic bearings, to facilitate assembly of the overall motor while diminishing the possibility of fluid escape into the center of the motor.

This is especially useful where a vacuum filling technique is to be used to draw fluid into the motor. Such techniques are well known in this field. The change in pressure activates the seals 714, 718 to seal the bearings from the interior of the motor. Then fluid provided adjacent the distal end of the shaft is drawn into the bearing by the pressure differential.

Figure 7:
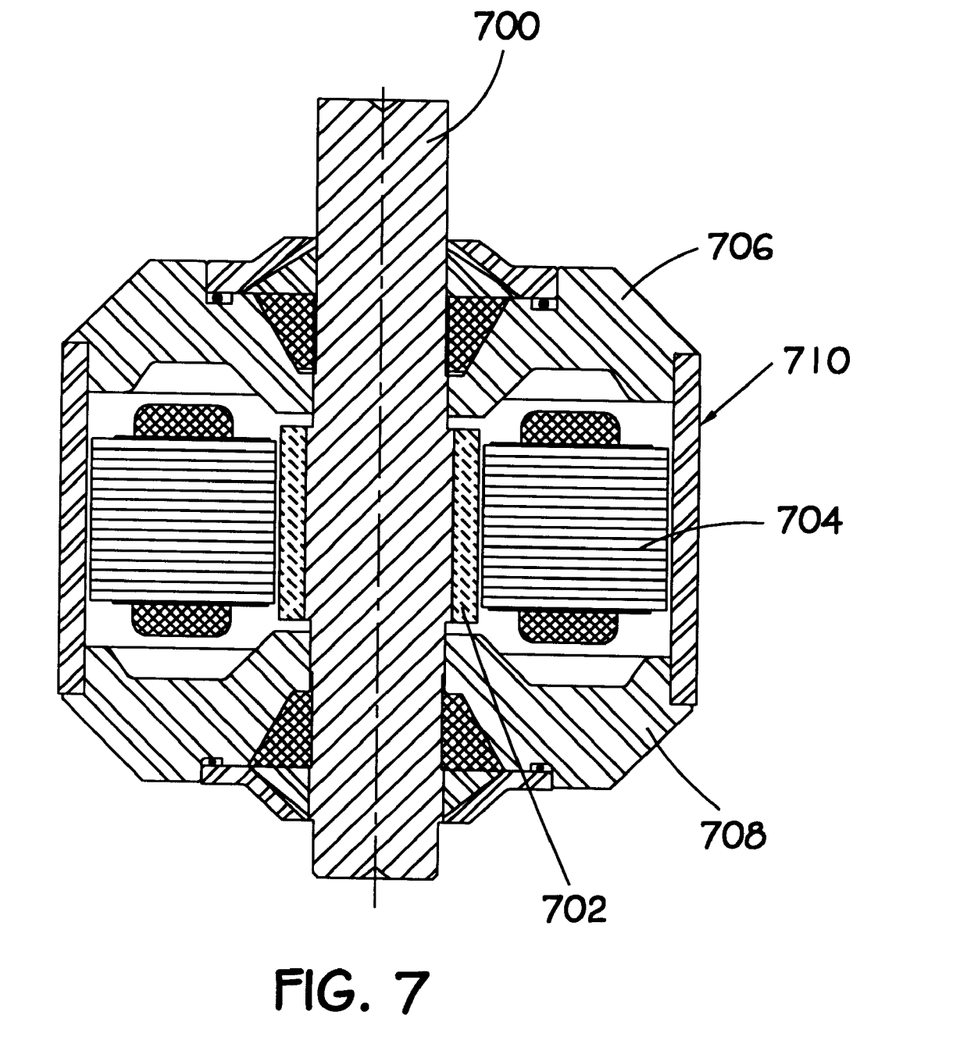
FIG. 7 is a vertical sectional view of an alternative embodiment utilizing a rotating shaft supported by the bearing and sealing means of the invention.

FIG. 7 illustrates the application of the principles of the invention to a rotating shaft design. The Figure shows a motor with rotating shaft 700 supporting a magnet 702 on a central section. The magnet 702 cooperates with stator 704 to cause rotation of the shaft. The hub, of course, is supported in place by supporting means (not shown) attached to the bearing seats 706, 708 which support the hub 710. The hydrodynamic bearing is otherwise as explained with respect to the preceding Figure showing fixed shaft designs.

Other alternatives to the present design disclosed herein may be within the skill of the art and apparent to a person who studies this disclosure. For example, grooved pumping seals could be used on either side of each fluid dynamic bearing; similarly, centrifugal capillary seals could be used above and below each fluid dynamic bearing. Further, in the hydrodynamic bearing and the grooved pumping seal, the grooves may be impressed on either surface without departing from the spirit of the invention. Therefore, the scope of the present invention is to be limited only by the following claims.

What is claimed is:

1. A spindle motor for use in a magnetic data storage system including a shaft having a central section and two independent fluid dynamic bearings on opposite sides of said central section, each of said bearings comprising a bearing cone fixed to the shaft and tapering inwardly towards said central section, and a bearing seat rotating around the shafts each of the bearing seats having a fluid bearing surface which is complementary to a surface of said bearing cone to thereby establish a first section of a fluid dynamic bearing, each of said fluid dynamic bearings further comprising a second gap section defined between an inner surface of said bearing cone and a surface of said shaft, and a third portion of a gap defined between a radially extending surface of said bearing cone and a complementary surface rotating with said bearing seat, so that a continuous gap is formed around each of said bearing cones, and fluid in said continuous gap separating said complementary surfaces of said bearing seat and said bearing cone to allow free rotation of said bearing seat relative to said shaft and said bearing cone and a centrifugal capillary seal on one side of each said bearing cone and a grooved pumping seal on the opposite side of each said bearing cone to isolate and contain said fluid within said independent fluid dynamic bearings.

2. The spindle motor as claimed in claim 1 wherein said bearing seats extend radially away from said shaft, and support a hub extending axially between said bearing seats to define an enclosed region around said shaft.

3. The spindle motor as claimed in claim 2 further incorporating a stator supported on said central section of said shaft and aligned with a magnet supported from said hub so that energization of said stator causes rotation of said hub about said shaft.

4. The spindle motor as claimed in claim 3 wherein an inner dimension of said stator is generally aligned with said bearing cones of each of said fluid dynamic bearings so that an in-hub motor of narrow cross-sectional dimension is defined.

5. The spindle motor as claimed in claim 4 further including a hollow region in said central section of said shaft, wires from said stator passing from said stator into said hollow region in said shaft to extend through a connector to provide electrical power to said stator.

6. The spindle motor as claimed in claim 4 wherein said bearing cone surfaces are substantially spherical in cross-section.

7. The spindle motor as claimed in claim 4 including a thrust plate supported by and rotating with said bearing seat and facing said radially extending surface of said bearing cone to define said third portion of said continuous gap, and a capillary seal formed between said thrust plate and said shaft to prevent fluid from leaking from said fluid dynamic bearings.

8. The spindle motor as claimed in claim 4 wherein each said bearing seat extends around said bearing cone and includes a section surrounding the shaft and defines the grooved pumping seal with said shaft.

9. The spindle motor as claimed in claim 8 further including a pressure activated bearing seal between said bearing cone and said central section of said shaft, said bearing seal being activated by a change in pressure in an interior space of said motor defined by said bearing seat and said hub extending between said bearing seats, activation of said pressure activated seal allowing filling of said fluid dynamic bearing with said fluid.

10. The spindle motor as claimed in claim 1 wherein bearing cone surface and said bearing seat surface are generally complementary.

11. The spindle motor as claimed in claim 10 wherein said bearing cone has a generally bi-spherical bearing surface, and said bearing seat has a spherical surface to define said first section of said continuous gap.

12. The spindle motor as claimed in claim 10 wherein an inner dimension of said bearing seat is generally aligned with said bearing cones of each of said fluid dynamic bearings so that an in-hub motor of narrow cross-sectional dimension is defined.

13. A magnetic disc storage system comprising:

a base, a rotatable magnetic storage disc having an axis of rotation, a transducing head for reading and writing information on the disc, a fixed shaft supported in said base having a central section supporting a stator, and independent fluid dynamic bearings on opposite sides of said central section of said shaft located near to said base and distant from said base on the opposite side of said stator, said fluid dynamic bearings each comprising a generally conical bearing member supported from said shaft and having a generally conical surface extending inwardly toward said central section of said shaft and cooperating with a complementary generally conical face of a bearing seat, said bearing seats extending generally radially away from said shaft beyond said stator and supporting a hub, a magnet aligned with said stator, activation of said stator causing rotation of said hub, rotation of said hub being supported by lubricating fluid in first and second gaps defined between said generally conical surfaces of said conical bearing members on said shaft, complementary surfaces on said bearing seat and a centrifugal capillary seal on one side of each said bearing and a grooved pumping seal on the opposite side of each said bearing to isolate and contain said fluid within said independent fluid dynamic bearings.

14. A magnetic disc storage system as claimed in claim 13 further including a seal cone supported from said shaft on an opposite side of said shaft from said central section and having a generally radial face cooperating with a generally radially extending surface of said conical bearing member to define a further portion of said gaps of said fluid dynamic bearing.

15. A magnetic disc storage system as claimed in claim 14 further including grooves extending between a radially inner surface of said conical bearing member and the surface of said shaft to define a further portion of said gaps for said lubricating fluid, so that said lubricating fluid may flow over and be maintained in contact with relatively rotating surfaces of said conical bearing member, said bearing seat, and said seal cone.

16. A magnetic disc storage system as claimed in claim 14 wherein the centrifugal capillary seal comprises means for positively pushing fluid from an open end of a hydrodynamic bearing gap at each end of said shaft into said gap of each said fluid dynamic bearings.

17. A magnetic disc storage system as claimed in claim 14 wherein said capillary seal includes a surface of said seal cone extending at an acute angle away from said shaft and said bearing seat supports a shield seal having a wall facing a wall of said seal cone to define a reservoir between said walls, fluid between said wall being forced into said fluid dynamic bearing with rotation of said bearing seat relative to said conical bearing member, and a meniscus beam across said fluid in said reservoir to prevent said fluid from escaping from said capillary seal and said fluid dynamic bearing.

18. A magnetic disc storage system as claimed in claim 17 wherein said grooved pumping seal comprises means for pumping fluid away from said central section of said shaft towards said fluid dynamic bearing when said bearing seats are rotating relative to said shaft.

19. A magnetic disc storage system comprising:

a base, a rotatable magnetic storage disc having an axis of rotation, a transducing head for reading and writing information on the disc, a fixed shaft supported in said base having a central section supporting a stator, and fluid dynamic bearings means fixed to said shaft on opposite sides of said central section of said shaft located near to said base and distant from said base on the opposite side of said stator, for providing independent continuous lubricating gaps, bearing seats extending generally radially away from said shaft beyond said stator and supporting a hub, and a magnet aligned with said stator, activation of said stator causing rotation of said hub, rotation of said hub being supported by lubricating fluid said independent continuous lubricating gaps defined by said bearing means.

20. A magnetic disc storage system as claimed in claim 19 including sealing means adjacent said fluid dynamic bearing means for establishing sealing stiffness adjacent said fluid dynamic bearing means.

* * * * *